US008206218B2

(12) United States Patent
Gutierrez Novelo

(10) Patent No.: US 8,206,218 B2
(45) Date of Patent: Jun. 26, 2012

(54) 3D VIDEOGAME SYSTEM

(75) Inventor: Manuel Rafael Gutierrez Novelo, Nueva Santa Maria (MX)

(73) Assignee: TDVision Corporation S.A. De C.V., Col. Nueva Santa Maria (MX)

(*) Notice: Subject to any disclaimer, the term of this patent is extended or adjusted under 35 U.S.C. 154(b) by 168 days.

(21) Appl. No.: 12/710,191

(22) Filed: Feb. 22, 2010

(65) Prior Publication Data

US 2010/0151944 A1 Jun. 17, 2010

Related U.S. Application Data

(63) Continuation of application No. 11/471,280, filed on Jun. 19, 2006, now Pat. No. 7,666,096, which is a continuation of application No. PCT/MX03/00112, filed on Dec. 19, 2003.

(51) Int. Cl.
*A63F 9/24* (2006.01)
(52) U.S. Cl. ............... 463/30; 463/32; 463/34; 463/43; 273/461; 345/419; 345/539; 345/653; 345/654; 348/42; 348/47; 348/51
(58) Field of Classification Search ............... 463/1–5, 463/7–9, 30–34, 36–39, 40–43, 49–57; 273/108.1, 273/127 R, 148 R, 148 B, 309, 317.1, 340, 273/343, 348, 361–367, 461; 345/1.1–1.3, 345/2.1–2.3, 3.1–3.4, 24, 419, 467–469, 345/473, 539, 543–544, 625, 636, 638, 653–656, 345/664–666, 682–683, 686, 949–950, FOR. 139, 345/FOR. 153; 348/14.15, 39, 42, 47–52, 348/115, 117, 121, 135–137, 141, 211.2, 348/211.4, 211.7–211.8, 211.14, 211.99, 348/576, 588–589, 719, 721, 734, E13.004, 348/E13.064–E13.067; 375/240.15–240.16, 375/240.25; 434/37–38, 43–44, 69, 118, 434/240, 256–257
See application file for complete search history.

(56) References Cited

U.S. PATENT DOCUMENTS 4,559,555 A 12/1985 Schoolman
(Continued)

FOREIGN PATENT DOCUMENTS

DE 198 06 547 A 11/1998
(Continued)

OTHER PUBLICATIONS

Akutsu, et al., Stereoscopic Display Which Shows 3D Natural Scenes Without Contradiction of Accommodation and Convergence, SPIE, 2005, vol. 5664, pp. 480-487.

(Continued)

*Primary Examiner* — Arthur O. Hall
(74) *Attorney, Agent, or Firm* — Knobbe Martens Olson & Bear LLP

(57) ABSTRACT

A 3D videogame system capable of displaying a left-right sequences through a different, independent VGA or video channel, with a display device sharing a memory in an immerse manner. The system has a videogame engine controlling and validating the image perspectives, assigning textures, lighting, positions, movements and aspects associated with each object participating in the game; creates left and right backbuffers, creates images and presents the information in the frontbuffers. The system allows handling the information of data associated to the xyz coordinates of the object's image in real-time, increases the RAM for the left-right backbuffer, with the possibility to discriminate and take the corresponding backbuffer, whose information is sent to the frontbuffer or additional independent display device sharing a memory in an immerse manner.

19 Claims, 13 Drawing Sheets

U.S. PATENT DOCUMENTS

| | | | |
|---|---|---|---|
| 4,825,393 A * | 4/1989 | Nishiya | 702/152 |
| 4,870,600 A | 9/1989 | Hiraoka | |
| 4,925,294 A | 5/1990 | Geshwind et al. | |
| 4,962,422 A | 10/1990 | Ohtomo et al. | |
| 5,355,181 A | 10/1994 | Ashizaki et al. | |
| 5,430,474 A | 7/1995 | Hines | |
| 5,467,104 A | 11/1995 | Furness, III et al. | |
| 5,510,832 A | 4/1996 | Garcia | |
| 5,523,886 A | 6/1996 | Johnson-Williams et al. | |
| 5,594,843 A | 1/1997 | O'Neill | |
| 5,694,530 A * | 12/1997 | Goto | 345/419 |
| 5,717,415 A * | 2/1998 | Iue et al. | 345/8 |
| 5,734,807 A | 3/1998 | Sumi | |
| 5,745,126 A | 4/1998 | Jain et al. | |
| 5,751,927 A | 5/1998 | Wason | |
| 5,801,705 A * | 9/1998 | Kato et al. | 345/419 |
| 5,801,717 A | 9/1998 | Engstrom et al. | |
| 5,867,210 A | 2/1999 | Rod | |
| 5,872,590 A | 2/1999 | Aritake et al. | |
| 5,877,840 A * | 3/1999 | Yamada et al. | 351/201 |
| 5,905,499 A | 5/1999 | McDowall et al. | |
| 5,929,859 A | 7/1999 | Meijers | |
| 5,973,704 A | 10/1999 | Nishiumi et al. | |
| 5,976,017 A | 11/1999 | Omori et al. | |
| 5,982,375 A * | 11/1999 | Nelson et al. | 345/419 |
| 5,986,667 A | 11/1999 | Jevans | |
| 6,005,607 A | 12/1999 | Uomori et al. | |
| 6,031,564 A | 2/2000 | Ma et al. | |
| 6,104,402 A * | 8/2000 | Goddard et al. | 345/419 |
| 6,108,029 A | 8/2000 | Lo | |
| 6,151,060 A | 11/2000 | Tabata | |
| 6,175,371 B1 * | 1/2001 | Schoulz et al. | 345/630 |
| 6,352,476 B2 | 3/2002 | Miyamoto et al. | |
| 6,384,859 B1 | 5/2002 | Matsumoto et al. | |
| 6,388,666 B1 | 5/2002 | Murray | |
| 6,466,206 B1 | 10/2002 | Deering | |
| 6,466,208 B1 | 10/2002 | Yet et al. | |
| 6,496,183 B1 | 12/2002 | Bar-Nahum | |
| 6,496,187 B1 | 12/2002 | Deering et al. | |
| 6,496,598 B1 | 12/2002 | Harman | |
| 6,501,468 B1 * | 12/2002 | Kaji | 345/419 |
| 6,515,662 B1 | 2/2003 | Garland | |
| 6,556,195 B1 | 4/2003 | Totsuka et al. | |
| 6,559,844 B1 | 5/2003 | Alamparambil | |
| 6,573,928 B1 | 6/2003 | Jones et al. | |
| 6,583,793 B1 | 6/2003 | Gould et al. | |
| 6,614,927 B1 | 9/2003 | Tabata | |
| 6,753,828 B2 * | 6/2004 | Tuceryan et al. | 345/8 |
| 6,760,020 B1 * | 7/2004 | Uchiyama et al. | 345/419 |
| 6,760,034 B2 | 7/2004 | Prache | |
| 6,765,568 B2 | 7/2004 | Swift et al. | |
| 6,816,158 B1 | 11/2004 | Lemelson et al. | |
| 6,985,162 B1 | 1/2006 | Schinnerer et al. | |
| 7,219,352 B2 | 5/2007 | Estrop | |
| 7,254,265 B2 | 8/2007 | Naske et al. | |
| 2002/0075286 A1 | 6/2002 | Yonezawa et al. | |
| 2002/0154214 A1 | 10/2002 | Scallie et al. | |
| 2003/0112327 A1 | 6/2003 | Jeong et al. | |
| 2003/0152264 A1 | 8/2003 | Perkins | |
| 2003/0179198 A1 | 9/2003 | Uchiyama | |

FOREIGN PATENT DOCUMENTS

| | | |
|---|---|---|
| JP | 2-109493 A | 4/1990 |
| JP | 07-296185 | 11/1995 |
| JP | 8-149519 A | 6/1996 |
| JP | 09-139957 | 5/1997 |
| JP | 09-237353 | 9/1997 |
| JP | 11-509998 | 8/1999 |
| JP | 2000-020757 | 1/2000 |
| JP | 2002-519792 | 7/2002 |
| JP | 2003-067784 | 3/2003 |

OTHER PUBLICATIONS

Ames, et al., Development of a Miniaturized System for Monitoring Vergence During Viewing of Stereoscopic Imagery Using a Head Mounted Display, SPIE, 2004, vol. 5291, pp. 25-35.

Eichenlaub, Passive Method of Eliminating Accommodation/Convergence Disparity in Stereoscopic Head Mounted Displays, SPIE, 2005, vol. 5665, pp. 517-529.

Fehn, Depth-Image-Based Rendering (DIBR), Compression and Transmission for a New Approach on 3D-TV, SPIE, 2004, vol. 5291, pp. 93-104.

Hendriks, et al., Real Time Synthesis of Digital Multi Viewpoint Stereoscopic Images, SPIE, 1999, vol. 3639, pp. 266-276.

Holliman, Mapping Perceived Depth to Regions of Interest in Stereoscopic Images, SPIE, 2004, vol. 5291, pp. 117-128.

Hur, et al., A Software-Based Minimum-Time Vergence Control Scheme for a Parallel-Axis Stereoscopic Camera, SPIE, 2004, vol. 5599, pp. 32-40.

Jin, et al., Creating a Comfortable Stereoscopic Viewing Experience: Effects of Viewing Distance and Field of View on Fusional Range, SPIE, 2005, vol. 5665, pp. 10-21.

Kwon, et al., Automatic control of parallel stereoscopic camera by disparity compensation, SPIE, 2003, vol. 5006, pp. 417-423.

Kwon, Automatic Vergence and Focus Control of Parallel Stereoscopic Camera by Cepstral Filter, Journal of Electronic Imaging, 2004, vol. 13(2), pp. 376-383.

Lee, et al., Parallel-Axis Stereoscopic Camera with Vergence Control and Multiplexing Functions, SPIE, 2003, vol. 5006, pp. 389-398.

Lee, et al., Adaptive Stereoscopic Image Conversion of 2D Image, SPIE, 2001, vol. 4471, pp. 66-72.

Lemmer, et al., Enhancement of Stereoscopic Comfort by Fast Control of Frequency Content with Wavelet Transformation, SPIE, 2003, pp. 283-291.

Nam, et al., Development of the Real-Time Stereoscopic Error Corrector and Convergence Controller, SPIE, 2006, vol. 60550H-1-9.

Park, Stereoscopic Imaging Camera with Simultaneous Vergence and Focus Control, Opt. Eng., 2004, 43(12) 3130-3137.

Schowengerdt, et al., Stereoscopic Retinal Scanning Laser Display with Integrated Focus Cues for Ocular Accommodation, SPIE, 2004, vol. 5291, pp. 366-376.

Schowengerdt, et al., True 3-D Scanned Voxel Displays Using Single or Multiple Light Sources, Journal of the SID, 2006, Journal of the SID, 2006, 14/2, pp. 135-143.

Shibata, et al., Examination of Asthenopia Recovery Using Stereoscopic 3-D display with Dynamic Optical Correction, SPIE, 2006, vol. 6055, pp. 60550E-1-8.

Shibata, et al., Stereoscopic 3-D Display with Dynamic Optical Correction for Recovering from Asthenopia, SPIE, 2005, vol. 5664, pp. 1-9.

Sun, et al., Evaluating Methods for Controlling Depth Perception in Stereoscopic Cinematography, SPIE, 2009, vol. 7237 pp. 723701-1-12.

Tam, et al., Depth Image Based Rendering for Multiview Stereoscopic Displays: Role of Information at Object Boundaries, SPIE, 2005, vol. 6016, pp. 601609-1-11.

Tzovaras, et al., Object-Based Coding of Stereo Image Sequences using Joint 3-D Motion/Disparity Segmentation, 1995, SPIE, vol. 2501, pp. 1678-1689.

Um, et al., Investigation of the Effect of Disparity-Based Asymmetrical Filtering on Stereoscopic Video, SPIE, 2004, vol. 5150, pp. 110-118.

Ware, et al., Algorithm for Dynamic Disparity Adjustment, SPIE, 1995, vol. 2409, pp. 150-156.

Watt, et al., Achieving near-correct focus cues in a 3-D display using multiple image planes, SPIE, 2005, vol. 5666, pp. 393-401.

Gotoh, H. "Gotoh Hiroshige's Monthly Report," DOS/V Power Report, Japan, Impress Corporation, Jul. 1, 2003, vol. 13, No. 7, pp. 125-126.

Scribner, et al., The Effect of Stereoscopic and Wide Field of View Conditions on Teleoperator Performance, Army Research Laboratory, Mar. 1998, pp. 1-40.

Heath, Jenny, Virtual Reality Resource Guide, AI Expert, May 1994, vol. 9, pp. 1-45.

Rodriguez, et al., Full Window Stereo, J. Mol. Graphics Mod., 1999, vol. 17, pp. 319-314.

Liao, et al., The Design and Application of High-Resolution 3D Stereoscopic Graphics Display on PC, The 8th International Conference in Central Europe on Computer Graphics, Visualization and interactive Digital Media 2000, Plzen (Pilsen), Czech Republic, Feb. 7-11, 2000, pp. 1-7 [retrieved from http://wscg.zcu.cz/wscg2000/Papers_2000/R5.pdf].

Bourke, Paul, 3D Stereo Rendering Using OpenGL (and GLUT), Nov. 1999 (7 pages).

Microsoft DirectX 8.1 (C++), Programmers Guide, available from www.sc.ehu.es/ccwgamao/docencia/Material/hoy/Direct3D, Jun. 17, 2002 (406 pages).

* cited by examiner

3D VIDEOGAME SYSTEM

RELATED APPLICATIONS

This application is a continuation of copending U.S. application Ser. No. 11/471,280, titled "3D Videogame System," filed Jun. 19, 2006, which is a continuation of PCT Application PCT/MX2003/000112 filed on Dec. 19, 2003, published in the Spanish language. The disclosures of all the above-referenced applications, publications, and patents are considered part of the disclosure of this application, and are incorporated by reference herein in their entirety.

FIELD OF THE INVENTION

The present invention is related to the display of three-dimensional television images, more specifically to a hardware and software design for viewing three-dimensional (3D) images, easy to be integrated to the existing television, personal computer and videogame system equipment.

BACKGROUND OF THE INVENTION

The visual man-machine interface is constantly trying to improve the images for a wide range of applications: military, biomedical research, medical imaging, genetic manipulation, airport security, entertainment, videogames, computing, and other display systems.

Three-dimensional (3D) information is the key for achieving success in critical missions requiring realistic three-dimensional images, which provide reliable information to the user.

Stereoscopic vision systems are based on the human eye's ability to see the same object from two different perspectives (left and right). The brain merges both images, resulting in a depth and volume perception, which is then translated by the brain into distance, surface and volumes.

In the state-of-the-art, several attempts have been made in order to achieve 3D images, e.g., the following technologies have been used:
  Red-blue polarization
  Vertical-horizontal polarization
  Multiplexed images glasses.
  3D virtual reality systems
  Volumetric displays
  Auto-stereoscopic displays All of the aforementioned technologies have presentation incompatibilities, collateral effects and a lack of compatibility with the current existing technology.

For example, red-blue polarization systems require, in order to be watched, a special projector and a large-size white screen; after a few minutes, collateral effects start appearing, such as headache, dizziness, and other symptoms associated to images displayed using a three-dimensional effect. This technology was used for a long time in cinema display systems but, due to the problems mentioned before, the system was eventually withdrawn from the market. Collateral symptoms are caused by the considerable difference in the content received by the left eye and the right eye (one eye receives blue-polarized information and the other receives red-polarized information), causing an excessive stress on the optical nerve and the brain. In addition, two images are displayed simultaneously. In order to be watched, this technology requires an external screen and the use of polarized color glasses. If the user is not wearing red-blue glasses, the three-dimensional effect cannot be watched, but instead only double blurry images are watched.

The horizontal-vertical polarization system merges two images taken by a stereoscopic camera with two lenses; the left and right images have a horizontal and vertical polarization, respectively. These systems are used in some new cinema theaters, such as Disney® and IMAX®3D theaters. This technology requires very expensive production systems and is restricted to a dedicated and selected audience, thus reducing the market and field of action. A special interest in the three-dimensional (3D) format has grown during the past three years; such is the case of Tom Hanks' productions and Titanic, which have been produced with 3D content by IMAX3D technology. However, this technology also results in collateral effects for the user after a few minutes of display, requires an external screen and uses polarized glasses; if the user is not wearing these glasses, only blurred images can be watched.

Systems using multiplexed-image shutting glasses technology toggle left and right images by blocking one of these images, so it cannot get to the corresponding eye for a short time. This blocking is synchronized with the image's display (in a monitor or TV set). If the user is not wearing the glasses, only blurred images are seen, and collateral effects become apparent after a few minutes. This technology is currently provided by (among others), BARCO SYSTEMS for Mercedes Benz®, Ford® and Boeing® companies, by providing a kind of "room" to create 3D images by multiplexing (shutter glasses) in order to produce their prototypes before they are assembled in the production line.

3D virtual reality systems (VR3D) are computer-based systems that create computer scenes that can interact with the user by means of position interfaces, such as data gloves and position detectors. The images are computer generated and use vector, polygons, and monocular depth reproduction based images in order to simulate depth and volume as calculated by software, but images are presented using a helmet as a displaying device, placed in front of the eyes; the user is immersed in a computer generated scene existing only in the computer and not in the real world. The name of this computer-generated scene is "Virtual Reality". This system requires very expensive computers, such as SGI Oxygen® or SGI Onyx Computers®, which are out of reach of the common user. Serious games and simulations are created with this technology, which generates left-right sequences through the same VGA or video channel, the software includes specific instructions for toggling video images at on-screen display time at a 60 Hz frequency. The videogame software or program interacts directly with the graphics card.

There is a technology called I-O SYSTEMS, which displays multiplexed images in binocular screens by means of a left-right multiplexion system and toggling the images at an 80 to 100 Hz frequency, but even then the flicker is perceived.

Only a few manufacturers, such as Perspectra Systems®, create volumetric display systems. They use the human eye capability to retain an image for a few milliseconds and the rotation of a display at a very high speed; then, according to the viewing angle, the device shows the corresponding image turning the pixels' color on and off, due to the display's high speed rotation the eye can receive a "floating image". These systems are very expensive (the "sphere" costs approximately 50,000 USD) and require specific and adequate software and hardware. This technology is currently used in military applications.

Auto-stereoscopic displays are monitors with semi-cylindrical lines running from top to bottom and are applied only to front and back images; this is not a real third dimension, but only a simulation in two perspective planes. Philips® is currently working in this three-dimension technology as well as SEGA® in order to obtain a technological advantage. Results are very poor and there is a resolution loss of 50%. This technology is not compatible with the present technological infrastructure and requires total replacement of the user's monitor. Applications not specifically created for this technology are displayed blurred, making them totally incompatible with the inconveniences of the current infrastructure. In order to watch a 3D image, the viewer needs to be placed at an approximate distance of 16" (40.64 cm), which varies according to the monitor's size, and the viewer must look at the center of the screen perpendicularly and fix his/her sight in a focal point beyond the real screen. With just a little deviation of the sight or a change in the angle of vision, the three-dimensional effect is lost.

In the state-of-the-art, there are several patents, which are involved in the development of this technology, namely:

U.S. Pat. No. 6,593,929, issued on Jul. 15, 2003 and U.S. Pat. No. 6,556,197, issued on Apr. 29, 2003, granted to Timothy Van Hook, et al., refer to a low cost video game system which can model a three-dimensional world and project it on a two-dimensional screen. The images are based on interchangeable viewpoints in real-time by the user, by means of game controllers.

U.S. Pat. No. 6,591,019, issued on Jul. 8, 2003, granted to Claude Comair et al., uses the compression and decompression technique for the transformation of a matrix into 3D graphical systems generated by a computer. This technique consists in converting real numbers matrixes into integer matrixes during the zeroes search within the matrix. The compressed matrixes occupy a much smaller space in memory and 3D animations can be decompressed in real-time in an efficient manner.

U.S. Pat. No. 6,542,971, issued on Apr. 1, 2003, granted to David Reed, provides a memory access system and a method which uses, instead of an auxiliary memory, a system with a memory space attached to a memory which writes and reads once the data input from one or more peripheral devices.

U.S. Pat. No. 6,492,987, issued on Dec. 10, 2002, granted to Stephen Morein, describes a method and device for processing the elements of the objects not represented. It starts by comparing the geometrical properties of at least one element of one object with representative geometric properties by a pixels group. During the representation of the elements of the object, a new representative geometric property is determined and is updated with a new value.

U.S. Pat. No. 6,456,290, issued on Sep. 24, 2002, granted to Vimal Parikh et al., provides a graphical system interface for the application of a use and learning program. The characteristic includes the unique representation of a vertex which allows the graphic line to retain the vertex status information, projection matrix and immersion buffer frame commands are set.

Any videogame is a software program written in some computer language. Its objective is to simulate a non-existent world and take a player or user into this world. Most videogames are focused in enhancing the visual and manual dexterity, pattern analysis and decision taking, in a competitive and improvement (difficulty level) environment, and are presented in large scenarios with a high artistic content. As a game engine, most videogames are divided into the following structure: videogame, game library with graphics and audio engines associated, the graphical engine contains the 2D source code and the 3D source code, and the audio engine contains the effects and music code. Every block of the game engine mentioned is executed in a cyclic way called a game loop, and each one of these engines and libraries is in charge of different operations, by example:

Graphics engine: displays images in general 2D source code: static images, "backs" and "sprites" appearing in a videogame screen.

3D source code: dynamic, real-time vector handled images, processed as independent entities and with xyz coordinates within the computer-generated world.

Audio engine: sound playback

Effects code: when special events happen, such as explosions, crashes, jumps, etc.

Music code: background music usually played according to the videogame's ambience.

The execution of all these blocks in a cyclic way allows the validation of current positions, conditions and game metrics. As a result of this information the elements integrating the videogame are affected.

The difference between game programs created for game consoles and computers is that originally, the IBM PC was not created for playing in it. Ironically, many of the best games run under an IBM PC-compatible technology. If we compare the PCs of the past with the videogames and processing capabilities of the present, we could say that PCs were completely archaic, and it was only by means of a low-level handling (assembly language) that the first games were created, making direct use of the computer's graphics card and speaker. However, the situation has changed. The processing power and graphics capabilities of present CPUs, as well as the creation of cards specially designed for graphics processes acceleration (GPUs) have evolved to such a degree that they surpass by far the characteristics of the so-called supercomputers in the 1980s.

In 1996, a graphics acceleration system known as "hardware acceleration" was introduced which included graphics processors capable of making mathematical and matrix operations at a high speed. This reduced the main CPU's load by means of card-specific communications and a programming language, located in a layer called a "Hardware Abstraction Layer" (HAL). This layer allows the information handling of data associated to real-time xyz coordinates, by means of coordinate matrixes and matrix mathematical operations, such as addition, scalar multiplication and floating point matrix comparison.

BRIEF DESCRIPTION OF THE INVENTION

An object of the present invention is to solve the incompatibility problems of the technologies for a three-dimensional image display.

Another object of the present invention is to provide a multi-purpose technology which allows the final user to watch video images, computer graphics, videogames and simulations with the same device.

An additional object of the present invention is to provide a technology which eliminates the collateral effects produced after watching the three-dimensional images provided by the present technologies, even for hours of constant use.

It is an additional object of the present invention to provide a technologically advanced integration in software by the creation of a pair of buffers corresponding to the left eye and the right eye, and hardware with an additional, independent display device which shares the memory in an immerse form, along with digital video image processors.

It is another object of the present invention to display the image physically on-screen by means of two front buffers created by graphics process units or GPUs.

Is still another object of the present invention to obtain brain perceptions of depth and volume with highly realistic images, even if they are created by computer graphics software.

Is still other object of the present invention to provide a TDVision® algorithm to create highly realistic computer images.

It is another object of the present invention to make changes in the current technological base to create a new digital imaging process with optical techniques in order to achieve a real image perception by setting the view of a right side camera.

It is another object of the present invention to achieve digital media convergence, wherein a DVD-playing computer, a movie-producing laptop, the video-image transmission capability of the internet, and PC and video game consoles can be used in the internet structure.

It is another object of the present invention to provide a new assembly language algorithm, analog and digital hardware to obtain the best adaptation to the existing technologies' 3D equipment.

It is still another object of the present invention to provide three-dimensional visual computer systems for the generation of stereoscopic images by means of animation, display and software modeling.

DETAILED DESCRIPTION OF THE INVENTION

Figure 1:
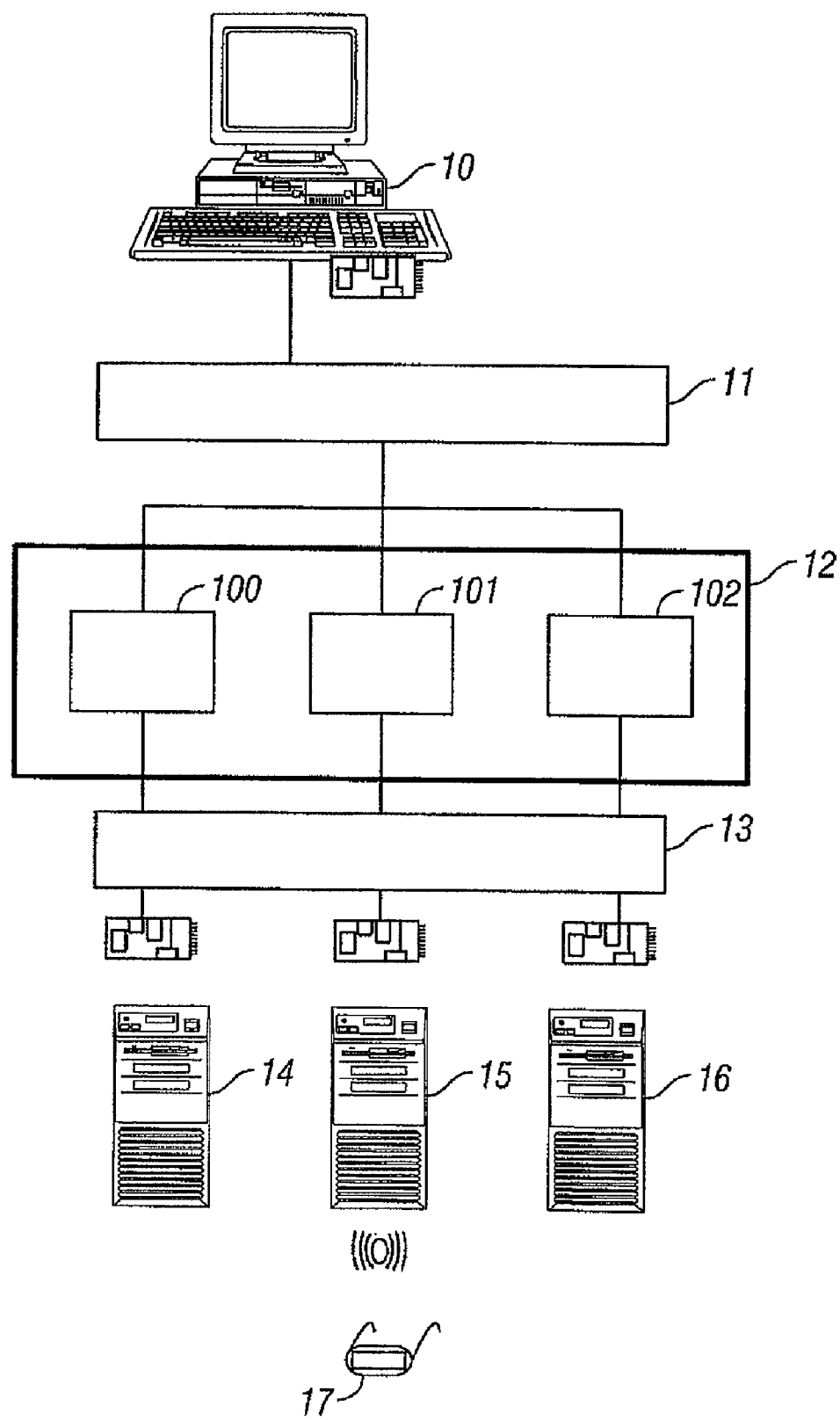
FIG. 1 shows the TDVision® videogame technology map.
Figure 2:
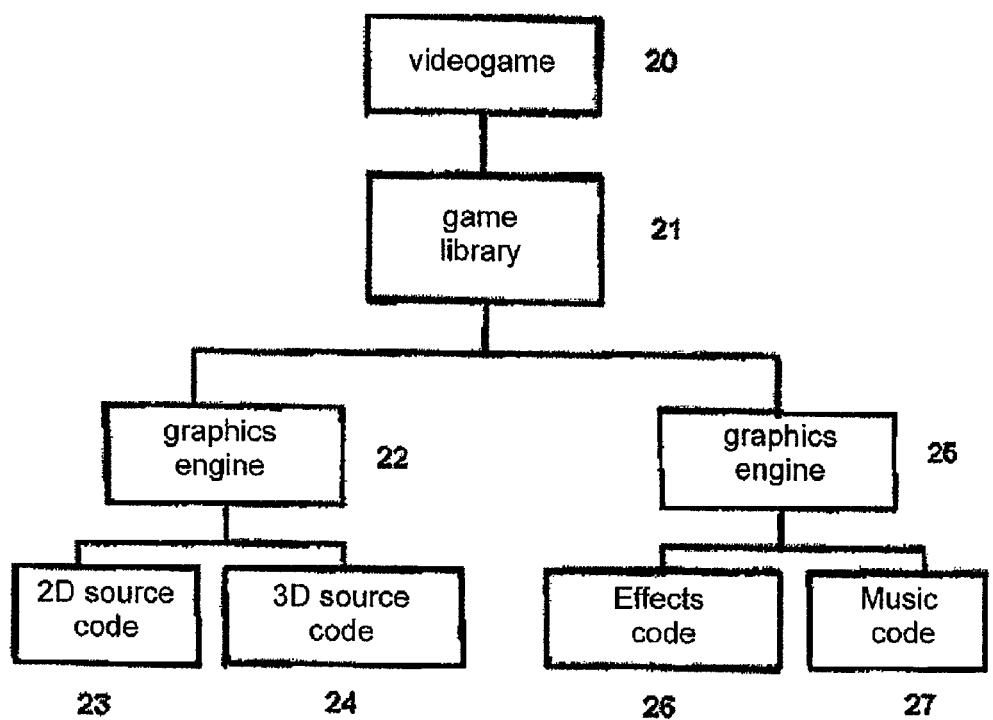
FIG. 2 shows the main structure for a videogame based on the previous art.

Videogames are processes which start by providing a plurality of independently related logical states which include a set of programming options, where each programming option corresponds to different image characteristics. The generic program instructions can be compiled into a code by several computing devices, without having to independently generate the object codes for each device.

The computer devices, such as personal computers, laptops, videogames, etc., include central processing units, memory systems, video graphical processing circuits, audio processing circuits and peripheral ports. Typically, the central processing unit processes software in order to generate geometric data referring to the image to be displayed and provides the geometric data to the video graphics circuit, which generates the pixel data stored in a memory frame where the information is sent to the display device. The aforementioned elements as a whole are typically called the videogame engine.

Some video game engines are licensed to a third party, as in the case of the Quake III Arena® program, which has the QUAKE ENGINE game engine; this engine was licensed to the VOYAGER ELITE FORCE game which uses the quake engine. This way, the game developers can concentrate in the game metrics, instead of having to develop a game engine from scratch. Originally, videogames used only two-dimensional images, called "sprites", which were the game's protagonists.

Most of the videogames and technologies have evolved and now allow working with simulated objects in a three-dimensional environment or world, giving each object xyz position properties, surrounded by other objects with the same characteristics and acting together within a world with a (0,0,0) origin.

At first, videogame consoles, separated from the computer world, took the first step to incorporate 3D graphics as a physical graphics capability of the devices. Techniques later were adopted by the hardware used in PCs. A circumstance-analysis element is also included, usually known as videogame applied artificial intelligence. This element analyzes the situation, positions, collisions, game risks and advantages, and based on this analysis, generates a response action for each object participating in the videogame.

A backbuffer is used, which is a memory location where the image to be displayed is temporarily "drawn" without outputting it to the video card. If this is done directly on the video memory screen, a flicker on the screen would be observed; therefore the information is drawn and processed quickly in the backbuffer. This backbuffer is usually located within the physical RAM memory of the video or graphics acceleration card.

A typical sequence within a videogame's algorithm would be:

Display title screen
Load characters, objects, textures and sounds into memory
Create a memory location for temporary processing, called doublebuffer or backbuffer.
Display background
Record the image under each element participating in the game
Clean all elements from memory (doublebuffer)
User input verification and player's position update
Enemy position processing by means of artificial intelligence (AI)
Move every participant object to its new position
Objects collision verification
Animation frame increment
Draw objects in backbuffer memory
Transfer backbuffer data to the screen
Go back to step 5, unless the user wants to end the game (step 15)

Delete all objects from memory

End game.

The most commonly used devices in a video game console are: The CPU or Central Processing Unit, which handles the game loop, user input from the keyboard, mouse or game devices as a gamepad or joystick and the game's artificial intelligence processing.

The GPU or Graphics Processing Unit handles the polygon modeling, texture mapping, transformations and lighting simulation.

The audio DSP or Digital Signal Processor handles the background music, sound effects and 3D positional sounds.

The graphics engine is the game section in charge of controlling and validating perspectives, assigning textures (metal, skin, etc.), lighting, positions, movements and every other aspect associated to each object participating in the videogame, for a videogame console or PC. This image set is processed in relation to the assigned origin point and calculating the distance, depth and position perspectives. This is made in two steps, but it is a complex process due to the mathematical operations involved, namely, the object translation process (offset from origin), and the object rotation process (rotation angle in relation to the current position).

Figure 3:
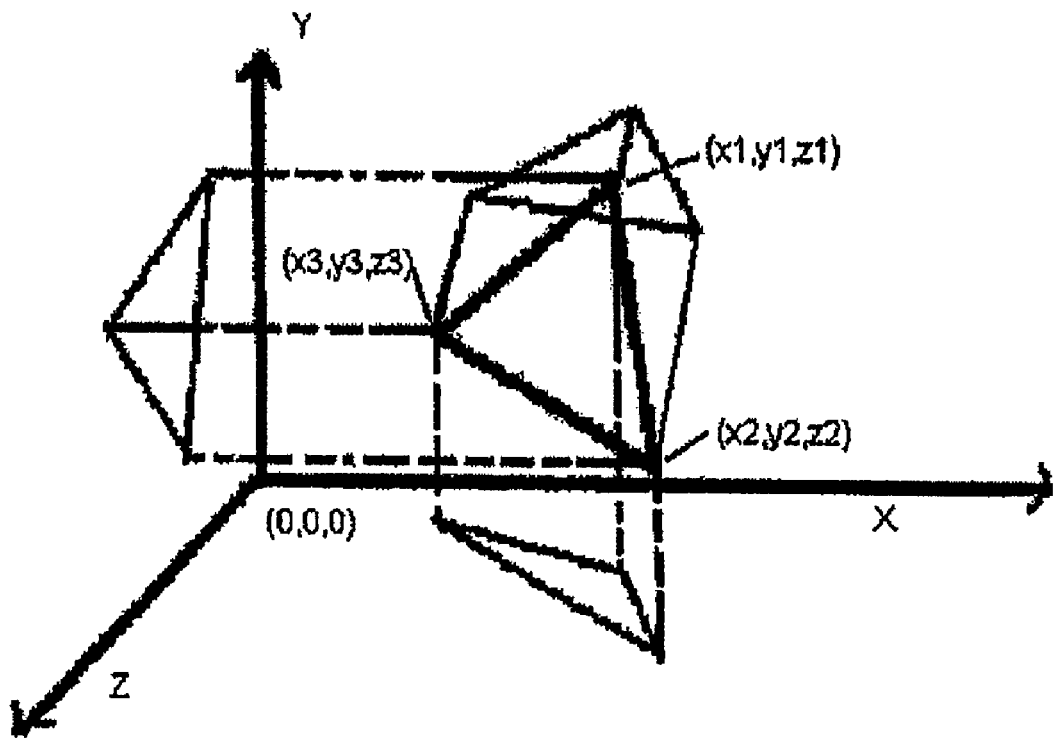
FIG. 3 shows the one embodiment of a three-dimensional element for constructing an object in a certain position in space.

It is important to note that the minimum image units (FIG. 3) are comprised of minimum control units called a "vertex", which represent one point in the xyz space. The minimum geometrical unit allowed is the triangle constructed by a minimum of three points in space; from the triangle base unit larger objects are formed, comprised of thousands of smaller triangles, as the Mario Sunshine character. This representation is called "Mesh" and texture, color and even graphical display characteristics can be associated to each mesh or even to each triangle. This information is denominated 3D graphics. It should be noted that even when it is called a 3D graphic due to its nature, constructed by xyz vectors, the final display to the user is generally in 2D, in a flat engine with content based on 3D vectors seen by the user as if they were in front of him, they only appear to have some intelligent depth and lighting characteristics, but for the brain they do not appear to have a volume in space.

Originally, it was necessary for the videogame programs to communicate directly with the graphics card to execute acceleration and complex mathematics operations, which meant that a game had to be practically rewritten in order to support a different video card. Facing this problem, Silicon Graphics® focused in developing a software layer (OpenGL®) which communicated directly with the hardware, with a series of useful functions and subroutines which, independently of the hardware, could communicate with it only in the graphical aspects. Microsoft® also developed a similar function group called DirecTX 3D, very much like OpenGL® but with a more complete functionality, as it included sound control and network gaming areas, among others.

These functions and subroutines set are called Graphics Applications Programming Interface (GRAPHICS API). These APIs can be accessed from different programming languages, as C, C++, Visual .Net, C# and Visual Basic, among others.

Every virtual reality system mentioned currently uses a left-right sequence through the same VGA or video channel scheme. These types of systems require software which includes specific instructions for alternating video images at on-screen display time in the backbuffer, applying a known offset algorithm using offsets and simulation-like angles.

Additionally to the functions provided by the OpenGL® and DirecTX® API, a series of graphics handling functions is available within an application-programming interface provided by Windows®, called WINDOWS API.

Figure 4:
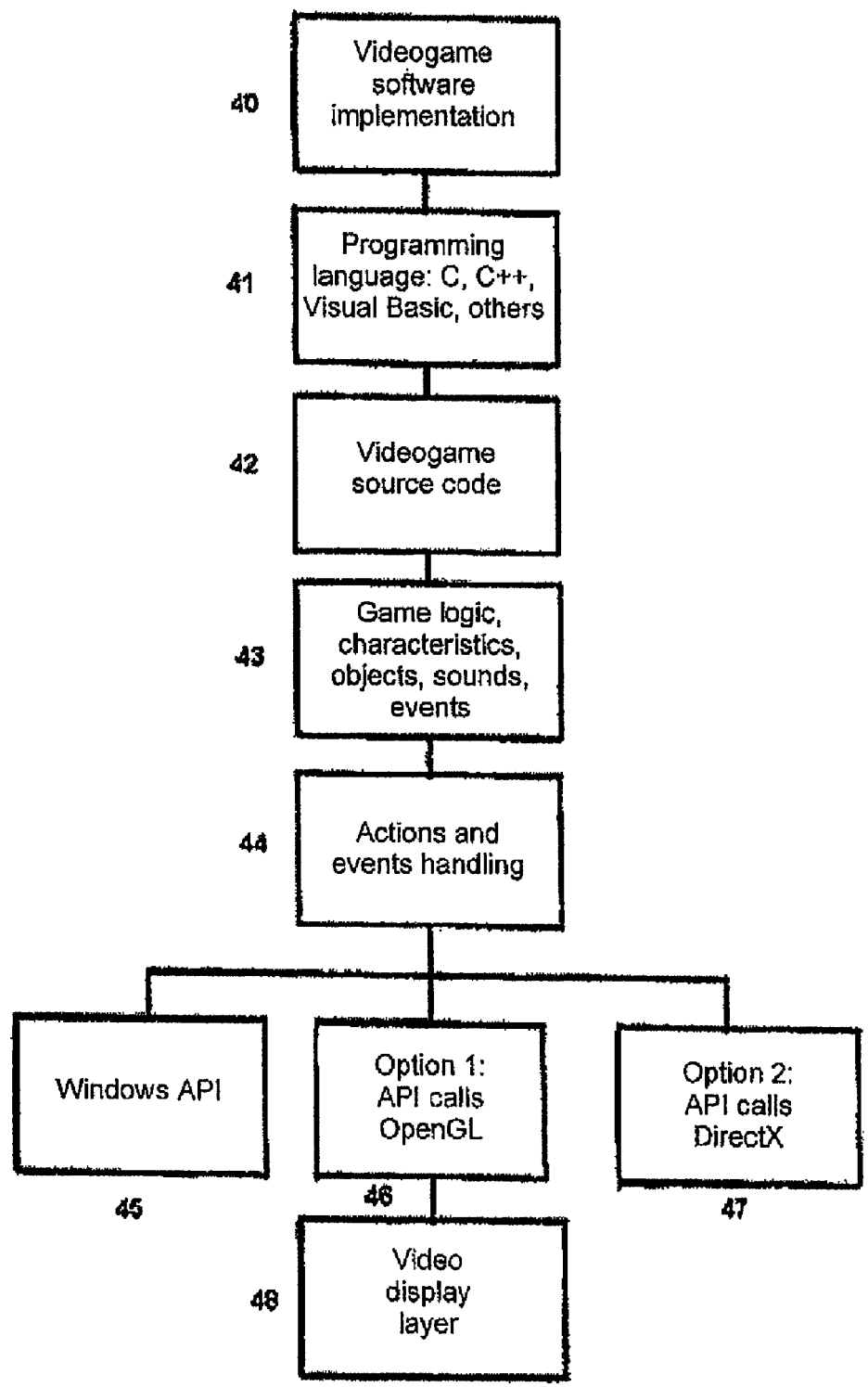
FIG. 4 shows the development outline of a videogame program based on the OpenGL and DirecTX API functions technologies.

The development of a videogame program based on these technologies is shown in FIG. 4, in which the videogame software developed in the present application by TDVision® Corp. implementation is included. FIG. 4 shows a schematic of the flowchart starting with the software implementation with the adequate metrics for the videogame (40), the software is developed in any appropriate programming language (such as C, C++, Visual Basic, Others) (41), the source code for the videogame (42), game logic and object characteristics, sounds, events, etc. are entered. (43), in (44) the event selector is located, which does this by means of the Windows API (45), OpenGL (46), or DirecTX (47), and is finally sent to the video display (48).

Although all of this refers to the software, something interesting is that DirecTX provides many functions, and Microsoft® achieved that even when initially some functions required specific hardware. The DirecTX API itself is capable of emulating the hardware characteristics by software, as if the hardware was actually present.

Embodiments of the present invention maximize and optimize the use of the OpenGL® and DirecTX® technologies, resulting in a software with certain specific characteristics, algorithms and digital processes in order to meet the specifications set by TDVision used in the present application.

Regarding the hardware, the Hal and the direct interface can be analyzed by drivers for each card, and in order to implement the TDVision technology the minimum specifications and requirements are analyzed, as well as any possible changes in the technology which allow it to obtain real 3D in TDVision's 3DVisors.

Regarding the display or representation systems, the information generated by the software and stored in the Graphic Device Context or Image Surface is transmitted directly to the last stage of the graphics card, which converts the digital video signal into analog or digital signals (depending on the display monitor), and the image is then displayed on screen.

The current display methods are:

Analog monitor with digital computer signal

Digital monitor

Analog monitor with TV signal 3D virtual reality systems.

The output type(s) depend on the video card, which should be connected to a compatible monitor.

Figure 4A:
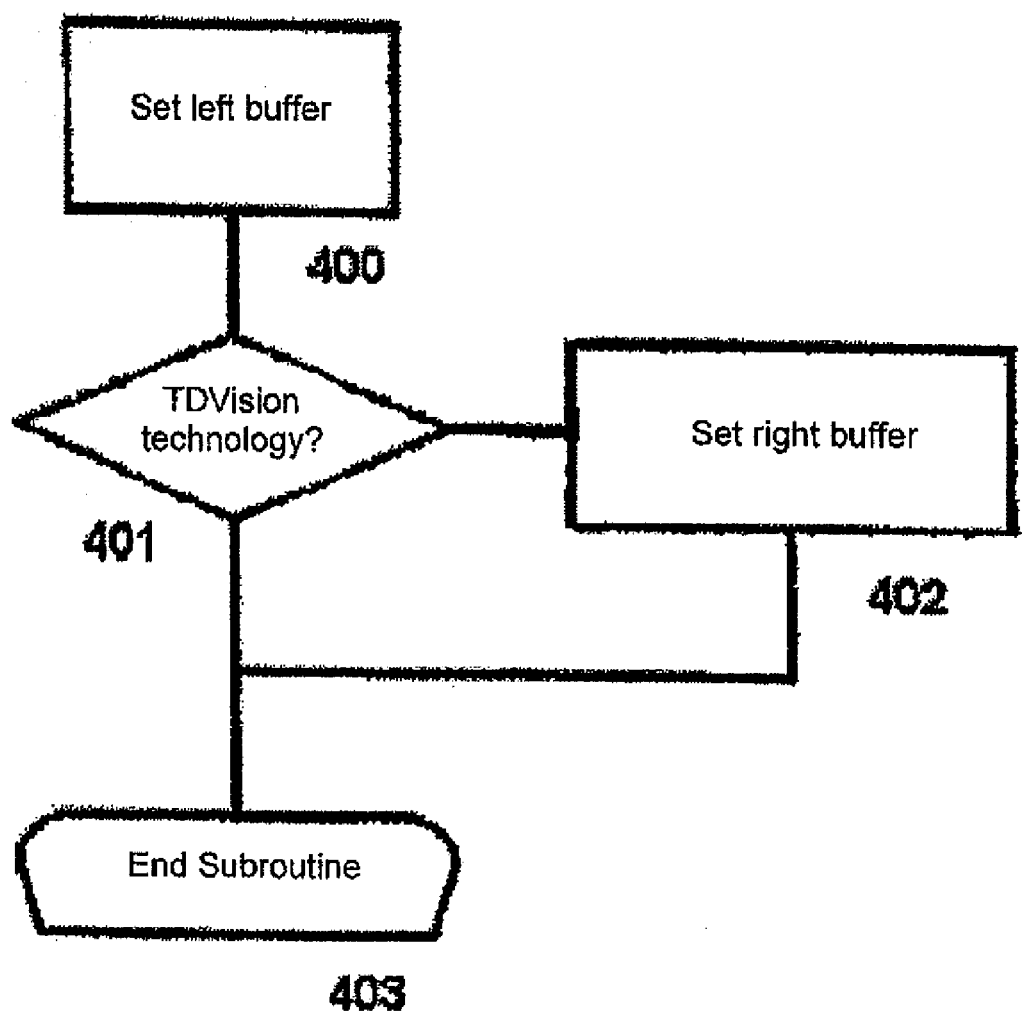
FIG. 4a shows a block diagram of one embodiment of an algorithm for creating the left and right buffers, and additionally discriminating if TDVision technology is used.

FIG. 4a shows the creation of memory locations for the temporary graphics processing (left and right backbuffers) in which basically it adds an extra memory location, i.e., sets a right buffer in (400) and discriminates in (401) if TDVision technology is present; in an affirmative case, it sets the left buffer in (402) and ends in (403); when TDVision technology is not present the process ends at (403), as there was nothing to discriminate.

Figure 4B:
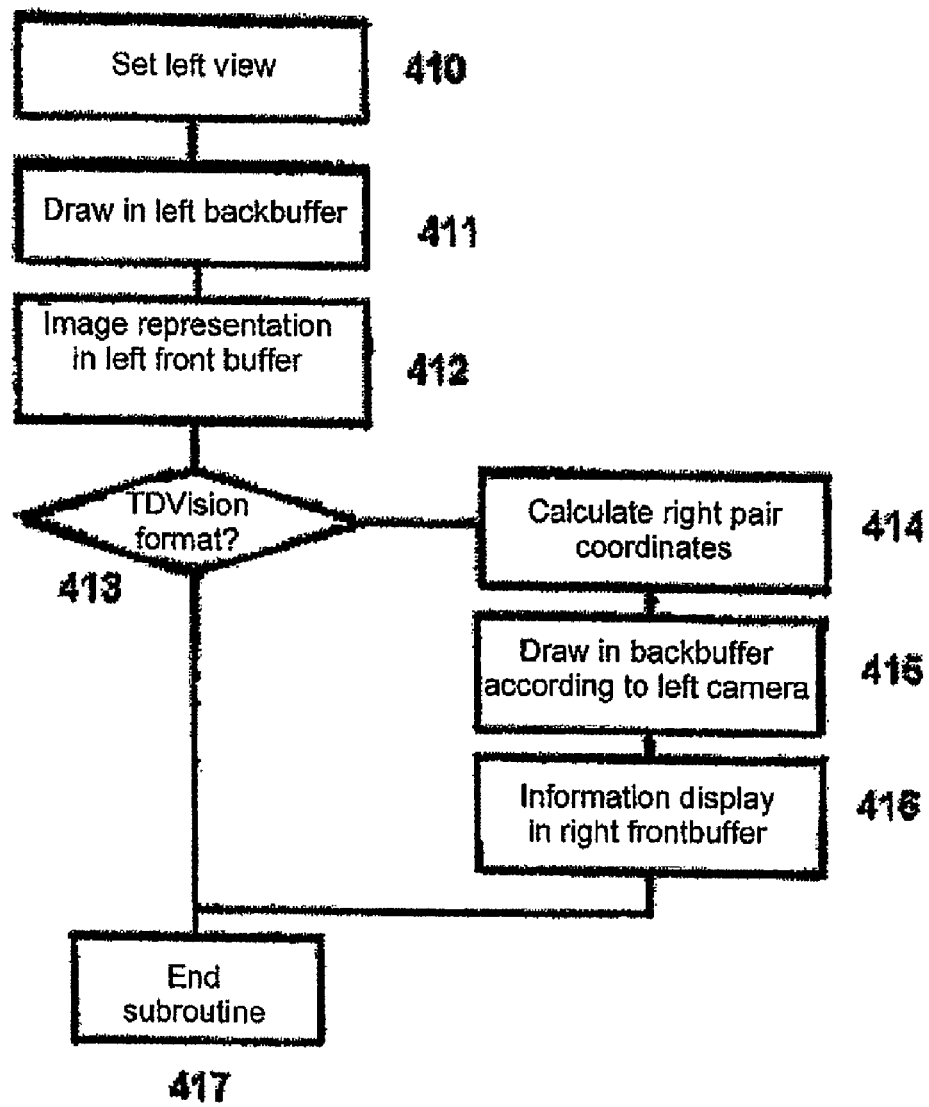
FIG. 4b shows a block diagram of a subroutine for setting the right camera view after drawing an image in the right backbuffer as a function of the right camera vector. The subroutine also discriminates if the TDVision technology format is used.

FIG. 4b shows the flowchart for the discrimination and display of the left camera and right camera image; the left view is set in (410), the image is drawn in the left backbuffer (411) as a function of the camera position, the image is displayed in the left screen (412), then it is discriminated if it has TDVision format in (413) and in the affirmative case the right view position coordinates are calculated (414), the image is drawn in the right backbuffer as a function of the left camera position (415), then the image is displayed in the right screen (416), the process ends at (417). If it is not necessary to discriminate in (413) as the image is provided in a current state-of-the-art format, the subroutine jumps to the final stage (417) and ends, as there is no need to calculate other coordinates and display parallel information. In one embodiment of the invention, the present application refers to the graphics-processing unit shown in FIG. 5 (GPU HARDWARE), and to the graphics engine (GRAPHICS ENGINE, SOFTWARE)

The hardware modifications are:
RAM increase for the left and right backbuffers
Implementing an additional independent display device in the display buffer but sharing the memory in an immense manner so it takes the corresponding backbuffer.

In this case the backbuffer's RAM memory and the video card's frontbuffer are large enough to support the left and right channels simultaneously. In current embodiments, this requires a minimum of 32 MB in order to support four buffers with a depth of 1024×768×4 color depth bytes each. Additionally, the video output signal is dual-ported (two VGA ports), or has the capability of handling multiple monitors, as it is the case of the ATI RADEON 9500® card, which has two output display systems, one VGA and one S-Video video ports to choose from. A graphics card is used which has a dual output only to meet the 60 frames per second display per left-right channel in order to be connected to a 3DVisor, these outputs are SVGA, S-Video, RCA or DVideo type outputs.

Figure 5A:
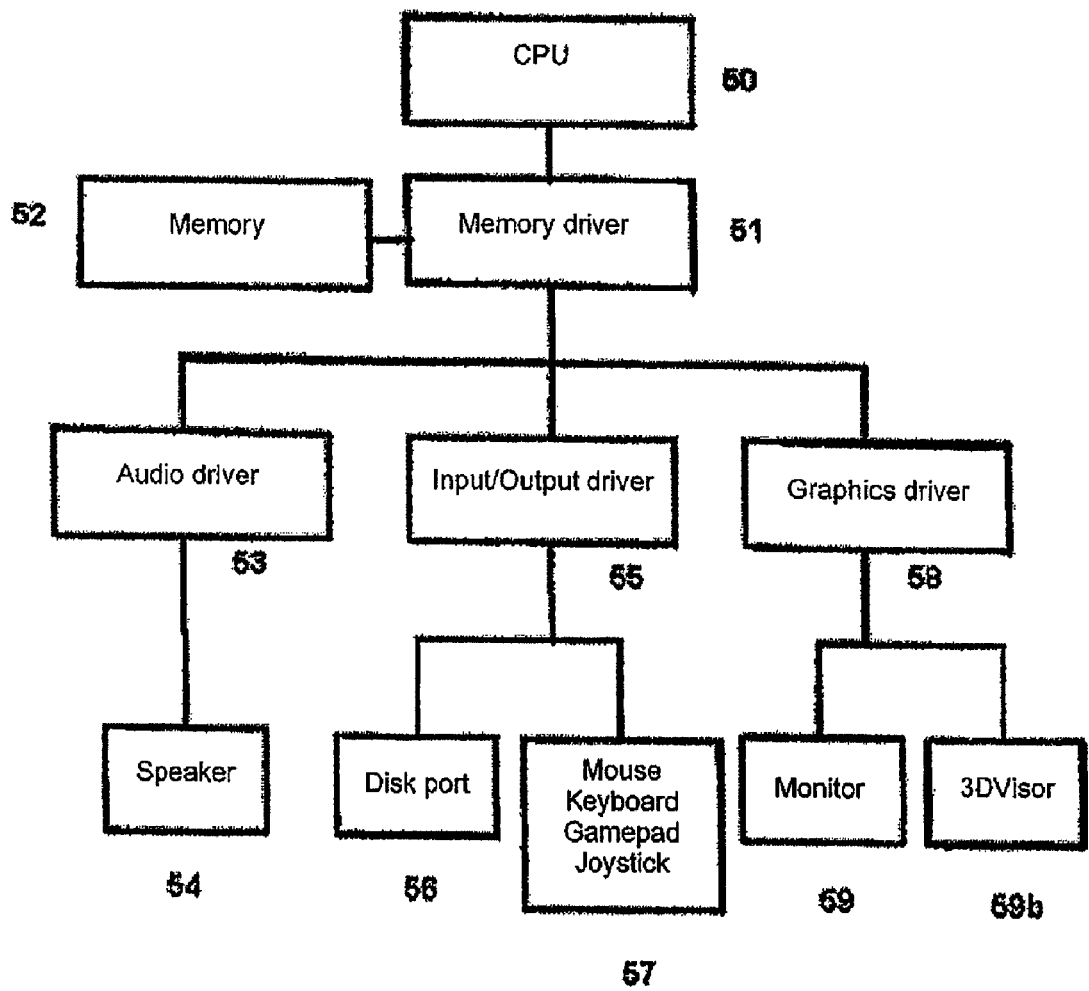
FIG. 5 shows a block diagram of the computing outline of the modifications to the graphical adapter for compiling the TDVision technology. It also allows the communication and contains the programming language and allows the information handling of the data associated with the images set.
Figure 5B:
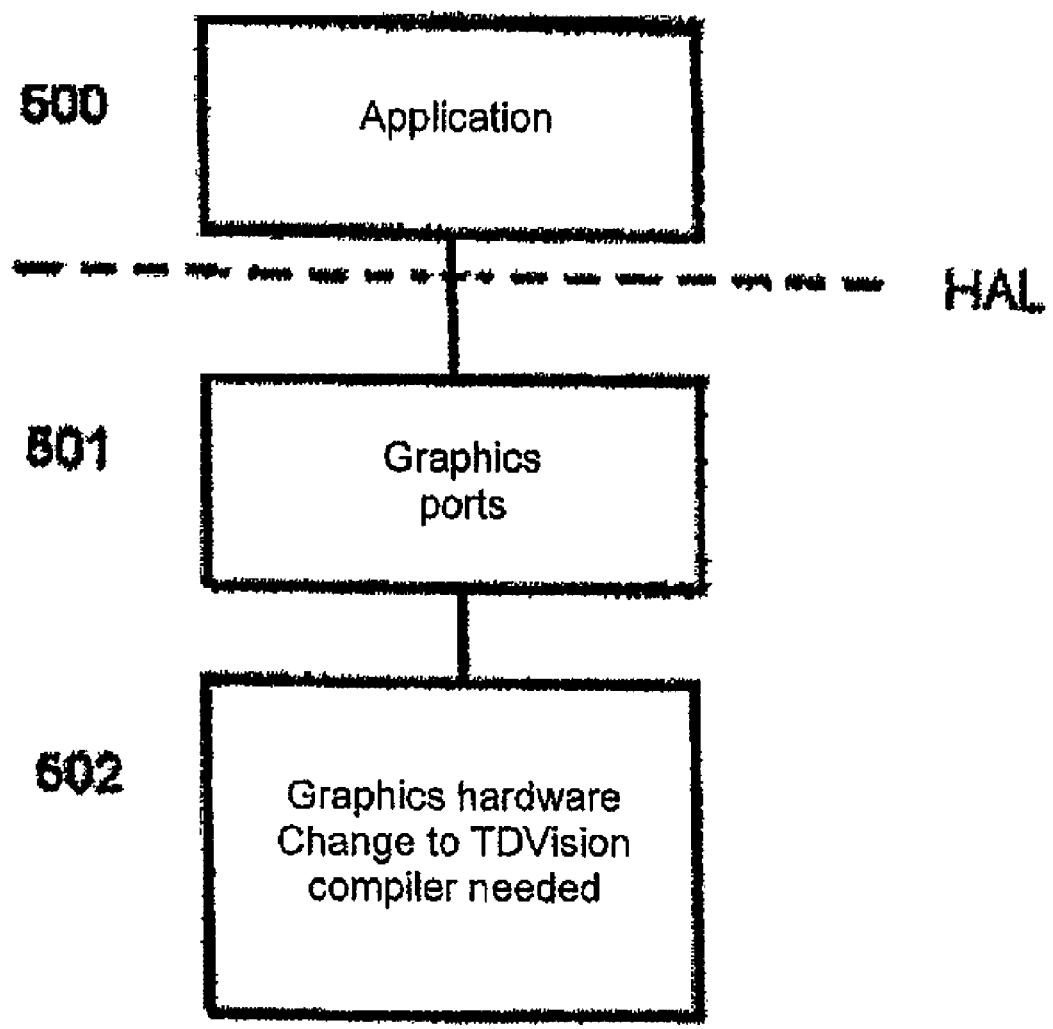

The computing scheme is presented with modifications for TDV compilation as described in FIG. 5. A CPU (50), the memory driver (52), and the extended memory (52) feeds the audio driver (53) and the speakers (54). Also the input and output driver (55) which in turn control the disk ports (56) and the interactive elements with the user (57) as the mouse, keyboard, gamepad and joystick. The graphics driver interacts directly with the monitor (59) and the three-dimensional visors 3DVISORS (59 b).

Concerning specifically the graphics hardware (HAL), changes are needed to compile the TDVision technology. For example, the application (500) sending the information to the graphics drivers (501) operating due to the graphics hardware support (502) effectively needs physical changes to be compiled with the TDVision technology. In order to implement the TDVision technology by means of OpenGL and DirecTX, modifications can be made in parts of the software section of a videogame as mentioned earlier, in some hardware sections.

Figure 6:
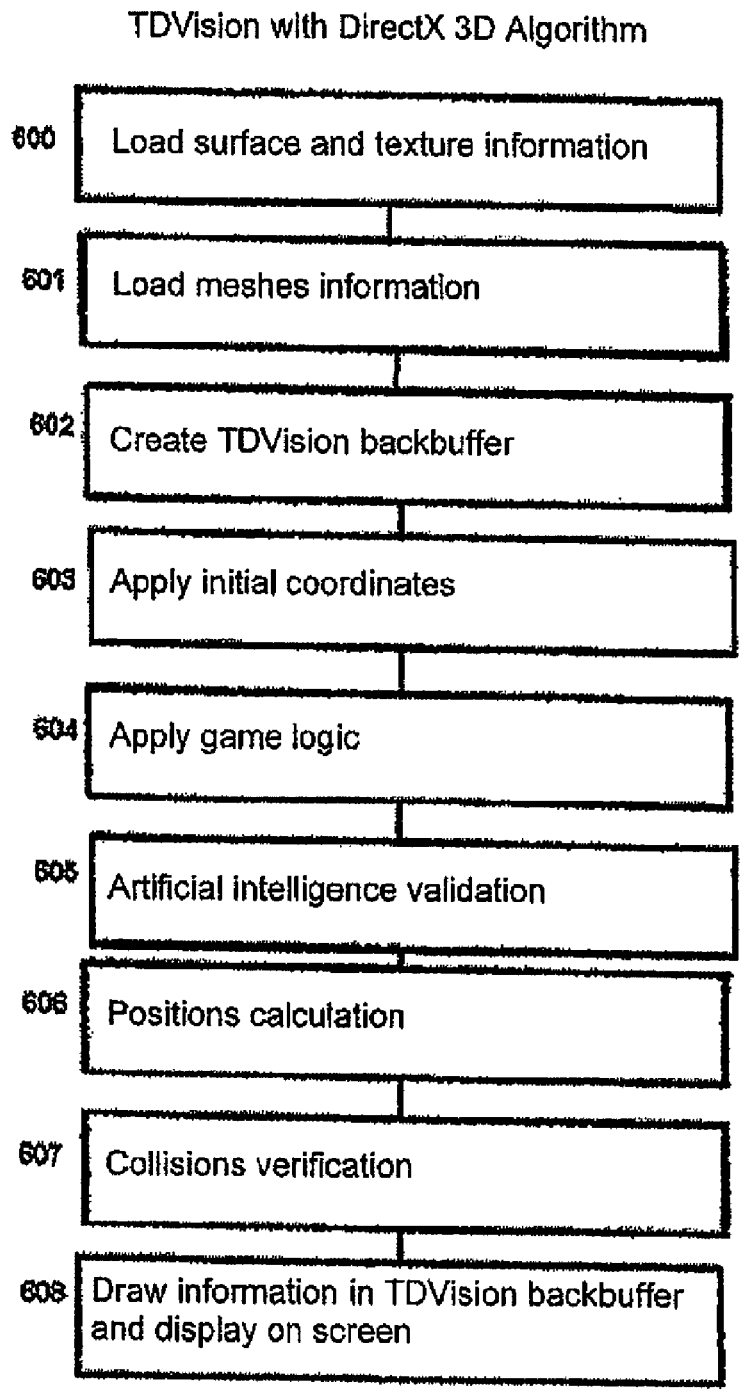
FIG. 6 represents a block diagram of an algorithm which allows the drawing of information in the TDVision backbuffer and presenting it on-screen in DirecTX 3D format.

Regarding the software, some special characteristics are added within a typical work algorithm, as well as a call to a TDVision subroutine, as it is shown in FIG. 6.
Load surfaces information (600)
Load meshes information (601)
Create TDVision backbuffer (602) in which a left backbuffer is created in memory, if it is TDVision technology then it creates a right backbuffer in memory.
Apply initial coordinates (603)
Apply game logic (604)
Validation and artificial intelligence (605)
Position calculation (606)
Collision verification (607)
Drawing the information in the TDVision backbuffer and display on screen (608), in which the right camera view is set. Drawing the image in the right backbuffer as a function of the current right camera vector, and displaying the image on the right screen (front buffer). If it is TDVision technology, then: Calculate the left pair coordinates, set the left camera view, draw the image in the left backbuffer as a function of the current vector of the left camera, display the information on the right screen (front buffer) which may use hardware modification.
Thus, a pair of buffers corresponding to the left eye and right eye are created, which, when evaluated in the game loop get the vectorial coordinates corresponding to the visualization of each right camera (current) and the left camera (complement calculated with the SETXYZTDV function) shown below.

It should be realized that said screen output buffers or front buffers are assigned from the beginning to the video display surface (device context) or to the surface in question (surface), but for displaying the information in a TDVision 3Dvisor two video outputs should be physically present. The right output (normal VGA) and the left output (additional VGA, digital complement or S-Video) should be present in order to be compatible with TDVision. In the example DirecTX is used, but the same process and concept can be applied to the OpenGL format.

Figure 7A:
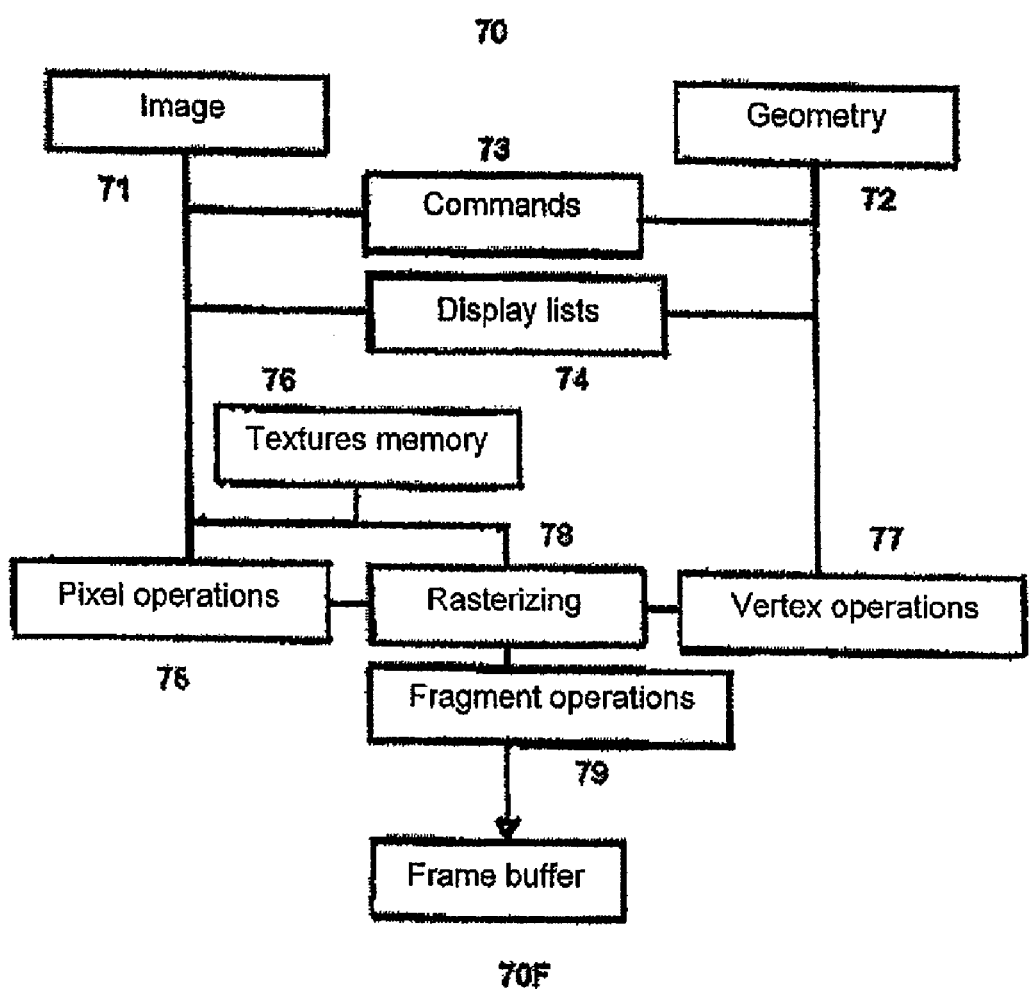
FIG. 7 shows the display sequence using the OpenGL format.
Figure 7B:
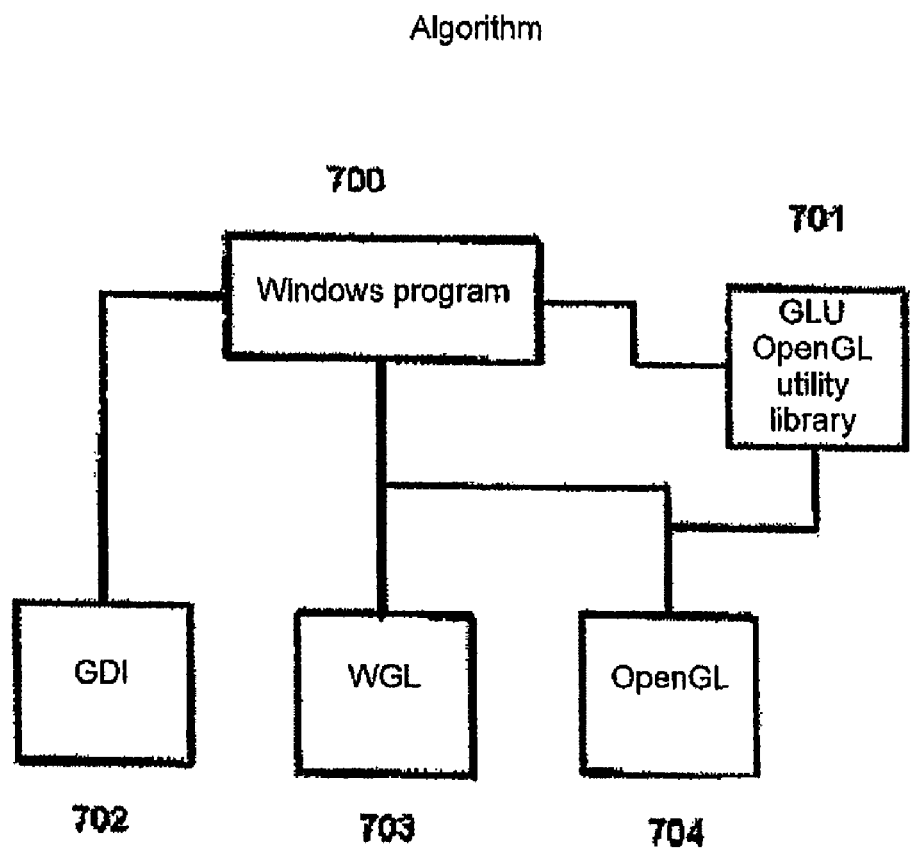

FIG. 7 shows an outline of the algorithm (70) conducting a display line of the graphical applications communications interface, effectively, by means of trigonometry (72) with the vertex operations (77), the image is constructed (71) and by means of pixel operations or image elements (75) through the commands (73), the display list (74) and a memory which assigns a texture to the image (76), resulting in the display being sent to the memory frame (70F) by the operations (79). The Windows software (700) communicates with (702) and the graphic language card (701), which in turn contains a graphic information library, which is useful to feed (703) and (704).

Figure 8:
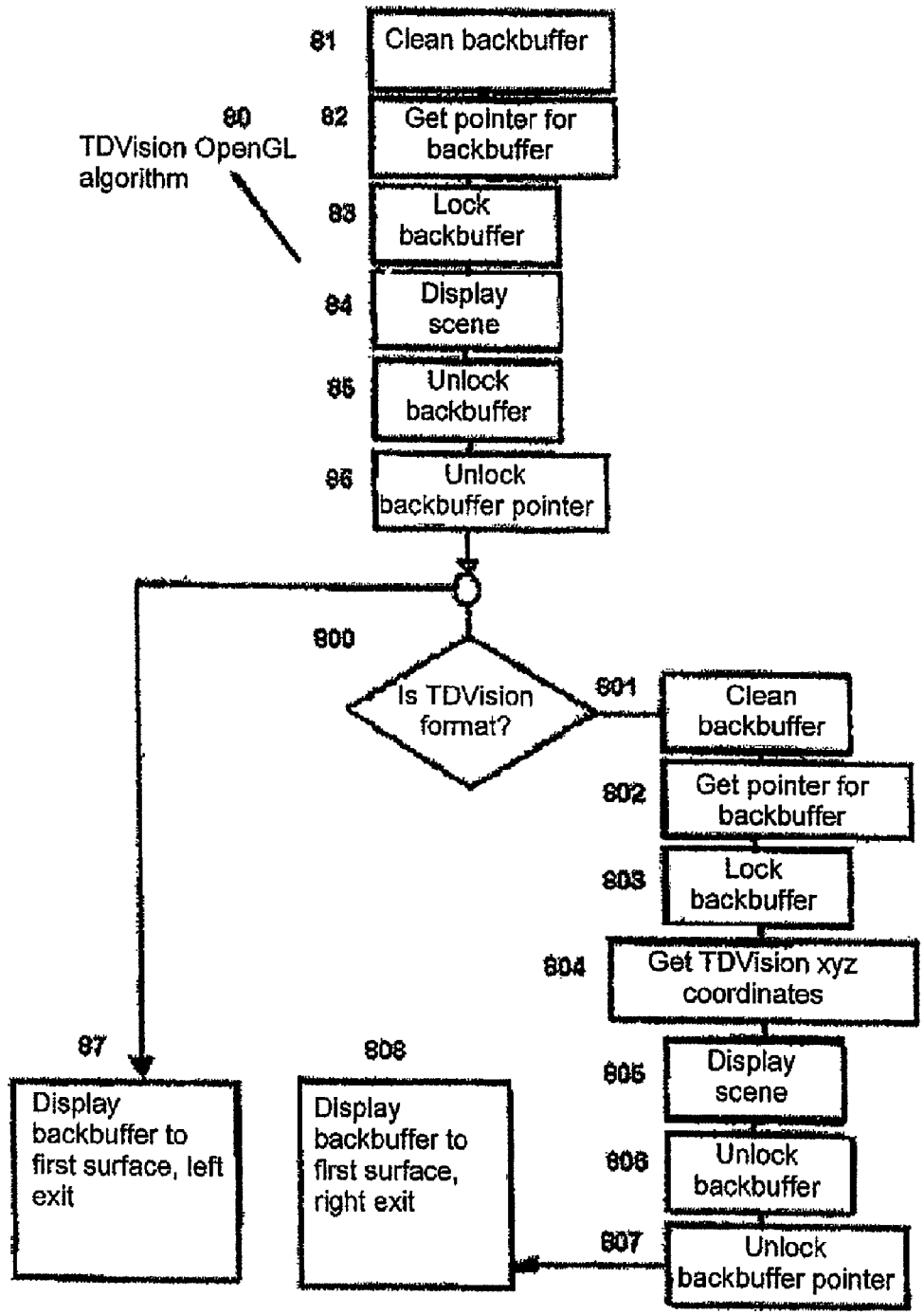
FIG. 8 shows the block diagram of the on-screen information display by means of the left and right backbuffers using the OpenGL algorithm.

FIG. 8 shows the TDVision technology using the OpenGL algorithm (80) to display the left and right image for the object, it cleans the backbuffer (81), gets the pointer for the backbuffer (82), closes the backbuffer (83), redraws the scene (84), opens the backbuffer (85), unlocks the backbuffer pointer (86), sends the image to the left display surface; in (800) it discriminates if it is TDVision technology and in an affirmative case it cleans the memory (801) and gets a pointer for the backbuffer (802), closes the backbuffer (803), gets the coordinates for the new perspective (804), redraws the scene (805), opens the memory (806), unlocks the backbuffer pointer (807), and sends the image to the right display surface (808).

Figure 9:
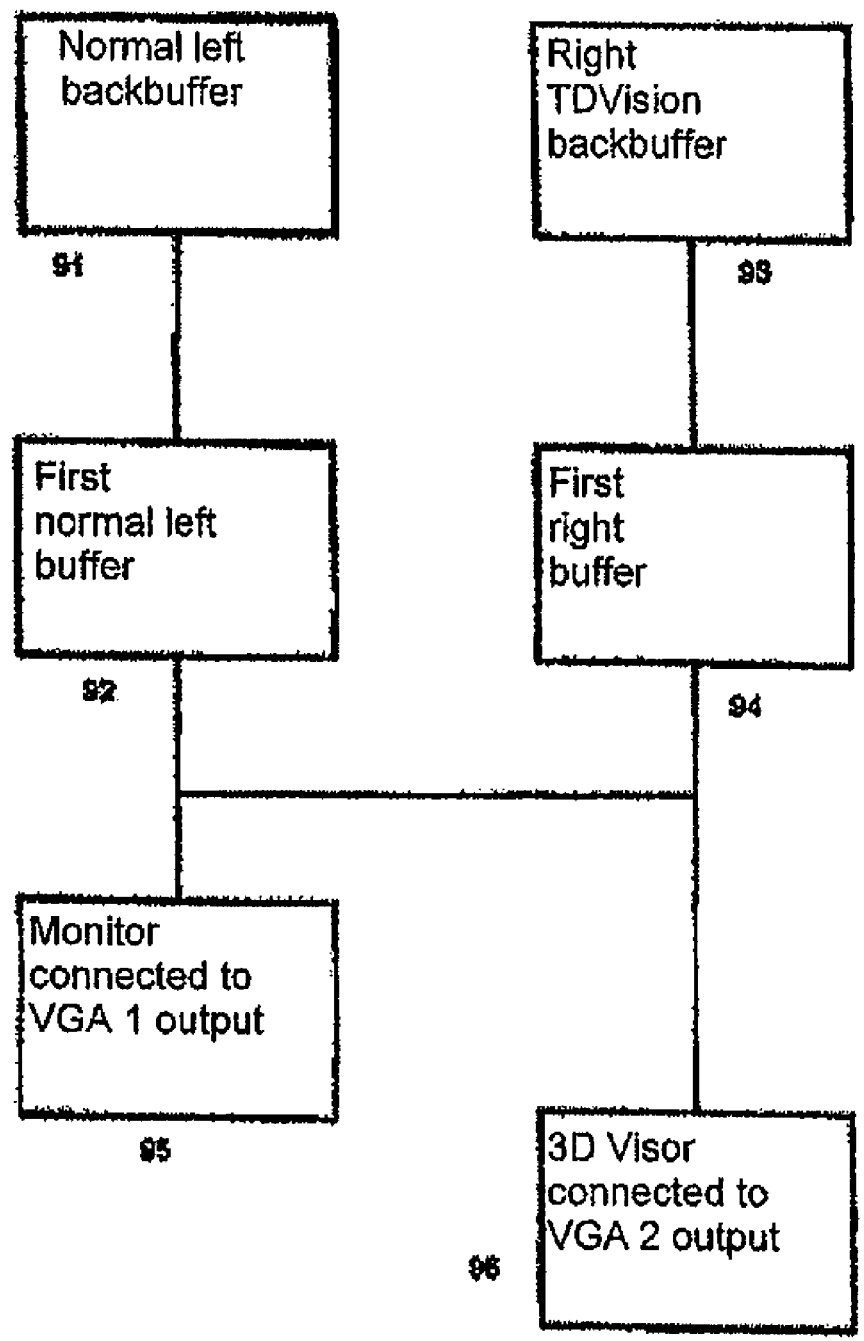
FIG. 9 shows the changes needed in the video card used for the TDVision technology.

FIG. 9 shows the changes (90) that can be made in the video card to compile TDVision technology. Namely, the left normal backbuffer (91) preceding the normal left primary backbuffer (92) which in turn is connected to the monitor's VGA output (95) and should have another VGA output so it can receive the right primary backbuffer (94), which in turn has the TDVision technology backbuffer as a precedent. Both left and right backbuffers can be connected to a 3DVisor (96) with a dual VGA input to receive and display the information sent by the backbuffers (91) and (93).

This software modifications use the following API functions in Direct X:
TDVision backbuffer creation:

```
FUNCTION CREATE BACKBUFFERTDV( )
Left buffer
Set d3dDevice = d3d.CreateDevice(D3DADAPTER_DEFAULT,_
    D3DDEVTYPE_HAL,hWndL,_
    D3DCREATE_SOFTWARE_VERTEXPROCESSING, d3dpp)
If GAMEISTDV then
Right Buffer
    Set     d3dDeviceRight =
d3d.CreateDevice(D3DADAPTER_DEFAULT,_
    D3DDEVTYPE_HAL,hWndR,_
    D3DCREATE_SOFTWARE_VERTEXPROCESSING, d3dpp2)
Endif
END SUB
```

Draw image in TDVision backbuffer:

```
FUNCTION DRAWBACKBUFFERTDV( )
    DRAW LEFT SCENE
    d3dDivice.BeginScene
    d3dDivece.SetStreamSource0, poly 1_vb, Len(poly1.v1)
    d3dDevice.DrawPrimitiveD3DPT_TRIANGLELIST,0,1
    d3dDevice.EndScene
```

Copy backbuffer to frontbuffer, screen

```
D3dDivice.Present By Val 0,By Val 0, 0, By Val 0
'VERIFIES IF IT IS A TDVISION PROGRAM BY
CHECKING THE FLAG
    IF GAMEISTDV THEN
        'CALCULATE COORDINATES RIGHT CAMERA
    SETXYZTDV ( )
        'Draw right scene
        d3dDevice2.BeginScene
        d3dDevice2.Set StreamSource 0, poly2_vb, Len(poly1,v1)
        d3dDevice2.DrawPrimitive D3DPT_TRIANGLELIST,0,1
        d3dDevice2.EndScene
        d3dDevice2.Present ByVal 0, ByVal 0, 0, ByVal
    END SUB.
```

Modifications to xyz camera vector:

```
VecCameraSource.z = z position
    D3DXMatrixLook AtLH matView, vecCameraSource,_
        VecCameraTarget, CreateVector (0,1,0)
    D3dDevice 2.SetTransform D3DTS_VIEW, matView
VecCameraSource.x = x position
    D3DXMatrixLook AtLH matView, vecCameraSource,_
        VecCameraTarget, CreateVector (0,1,0)
    D3dDevice 2.SetTransform D3DTS_VIEW, matView
VecCameraSource.y = y position
    D3DXMatrixLook AtLH matView, vecCameraSource,_
        VecCameraTarget, CreateVector (0,1,0)
    D3dDevice 2.SetTransform D3DTS_VIEW, matView
```

Thus, a pair of buffers corresponding to the left eye and right eye are created, which, when evaluated in the game loop get the vectorial coordinates corresponding to the visualization of the right camera and the left camera (complement calculated with the SETXYZTDV function) by means of the usual coordinate transform equations.

It should be realized that the screen output buffers or front buffers are assigned from the beginning to the device context or to the surface in question, but for displaying the information in a TDVision 3Dvisor it is necessary that two video outputs are physically present, the right output (normal VGA) and the left output (additional VGA, digital complement or SVIDEO) in order to be compatible with TDVision.

The example was made using DirecTX, but the same process and concept can be applied for the OpenGL format shown in FIG. 8.

In this case the backbuffer's RAM memory and the video card's frontbuffer should be large enough to support the left and right channels simultaneously. Thus, they should use a minimum of 32 MB in order to support four backbuffers with a color depth of 1024×768×4 bytes each. As it was mentioned before, the video output signal is preferably dual (two VGA ports), or has the capability to handle multiple monitors, as it is the case of the ATI RADEON 9500® card, which has two output display systems, one VGA and one S-Video and one DVideo port to choose from.

A graphics card is created which has a dual output only to meet the 60 frames per second display per left-right channel in order to be connected to a 3DVisor, these outputs can be SVGA, S-Video, RCA or DVideo type outputs.

Therefore, the images corresponding to the camera viewpoint in both left and right perspectives can be obtained and the hardware will recognize the information to be displayed in two different and independent video outputs, without multiplexing and displayed in real-time. Presently, all the technologies use multiplexion and software simulation. In the technology proposed by the present application real information can be obtained and while using the 3Dvisors. The image can be displayed from two different perspectives and the brain will associate the volume it occupies in space, without any flickering on screen, effect associated to the current state-of-the-art technologies.

A coordinate calculation method of the secondary stereoscopic camera (SETXYZTDV( )) allows obtaining three-dimensional computer visual systems for the generation of stereoscopic images by animation, display and modeling in software programs. This method allows obtaining spatial coordinates (x, y, z) that are assigned to two computer-generated virtual visualization cameras to obtain a stereoscopic vision by using any software program that simulates the third dimension and generates the images by means of the object's movement, or by the "virtual camera" movement observed at that moment by the computer-generated object. Examples include: Autocad, Micrografix Simply 3D, 3Dmax Studio, Point, Dark Basic, Maya, Marionette, Blender, Excel, Word, Paint, Power, Corel Draw, Photo paint, Photoshop, etc. However, all of these programs are designed to display only one camera with one fixed or moving perspective.

An additional 3D modeling and animation characteristic is added to the previous programs by means of the coordinate transformation equations, namely:

$$x = x' \cos \phi - y' \sin \phi$$

$$y = x' \sin \phi + y' \cos \phi$$

The exact position is calculated for a second or secondary camera, directly linked to the first camera and by this means two simultaneous images are obtained from different perspectives simulating the human being's stereoscopic visual perspective. This procedure, by means of an algorithm, calculates in real-time the position of the secondary camera to place it in the adequate position, and to obtain the modeling image and representation of the second camera, achieved using the coordinate transforming equations, taking the camera to the origin the angle and distance between the secondary camera and the object or objective are calculated, then the primary camera, objective and secondary camera are repositioned in the obtained position. Then, seven parameters need to be known, namely, the first coordinates ($X_p$, $Y_p$, $Z_p$) of the primary camera in the original coordinate system, the fourth parameter is the equivalent distance to the average separation of the eyes (6.5 to 7.0 cm), and the three coordinates of the objective's position when observed by the cameras.

The output parameters will be the coordinates of the secondary camera observing the same objective point, i.e., ($X_s$, $Y_s$, $Z_s$), obtained following these steps:

Knowing the coordinates of the primary camera in the original coordinate system ($X_p$, $Y_p$, $Z_p$), Knowing the objective's coordinates (xt, yt, zt)

Only the "x" and "z" coordinates are transformed, as the coordinate and/or height of the camera is kept constant (there is no visual deviation for the observer)

The coordinates for the primary camera are taken to the (0, ys, 0) position.

The objective is also translated

The slope for the line connecting the camera and the objective is calculated

The angle between the axis and the vector joining the primary camera with the objective is created.

The quadrant to which it belongs for the application of special considerations in the angle's calculation is classified by an inverse tangent function.

New coordinates are obtained, rotating the whole coordinate system from its axis in the same angle between the axis and the vector, a new coordinate system is obtained in which the object is placed on the 'z' axis and the primary camera will remain at the origin of the new coordinate system.

The coordinates of the secondary camera are obtained by placing it in the human eyes' average distance position These coordinates are rotated in the same initial angle The "x" and "z" offsets are added, which were originally subtracted to take the primary camera to the origin Finally, these two new $X_s$ y $Z_s$ coordinates are assigned to the secondary camera and the yp coordinate is maintained, which determines the height for the same value of a final coordinates point $(X_s, Y_p, Z_s)$ to be assigned to the secondary camera.

The procedure can be implemented in languages as Delphi, C, C++, Visual C++, Omnis, etc., but the result will be the same.

The generalized application of this algorithm will be used in any program requiring to obtain in real-time the position of a secondary camera.

This algorithm must be implemented in any existing software which handles two dimensions but has been developed for stereoscopic vision applications.

The particular embodiments of the invention have been illustrated and described, for the technical experts it will be evident that several modifications or changes can be made without exceeding the scope of the present invention. The attached claims intend to cover the aforementioned information so that all the changes and modifications are within the scope of the present invention.

The invention claimed is:

1. A method in a videogame system for displaying three-dimensional images, comprising the computer implemented steps of:
providing left and right backbuffers;
calculating first position coordinates of a first eye view;
storing a first eye view image captured virtually from the calculated first position coordinates of the first eye view of an object in the videogame into the left backbuffer;
calculating, with a processor of the videogame system, second position coordinates of a second eye view of the object in three dimensional space using the calculated first position coordinates of the first eye view;
determining a second eye view image of the object captured virtually from the calculated second position coordinates of the second eye view;
storing the second eye view image in the right backbuffer; and
displaying the first eye view image and the second eye view image to the user to provide a three dimensional perspective of the object from the videogame system to a user.

2. The method according to claim 1, wherein the first eye view image corresponds to a first virtual object in the videogame.

3. The method according to claim 1, wherein calculating the second position coordinates comprises calculating the x and z coordinates of the second eye view only so that there is no deviation in the height of the second eye view in relation to the height of the first eye view.

4. The method according to claim 1, wherein calculating the second position coordinates of the second view image comprises calculating the coordinates of a right eye camera view position.

5. The method according to claim 1, wherein calculating the second position coordinates of the second eye view comprises obtaining spatial coordinates by coordinate transformation equations given the location of a first virtual camera corresponding to the first eye view.

6. The method according to claim 1, wherein displaying the images in the left and right backbuffers comprises generating left and right images on different video channels.

7. A method in a videogame system for displaying three-dimensional images, comprising the computer implemented steps of:
providing first and second buffers;
calculating first position coordinates of a first eye view;
storing a first eye view image captured virtually from the calculated first position of the first eye view of a virtual object in the videogame into the first buffer;
calculating, with a processor of the videogame system, second spatial coordinates of a second eye view of the virtual object in the videogame in three dimensional space by coordinate transformation equations using the calculated first position coordinates of the first eye view and the position of the virtual object in the videogame;
determining a second eye view image of the virtual object based on the calculated second spatial coordinates;
storing the second eye view image in the second buffer; and
outputting the first eye view image from the first buffer and the second eye view image from the second buffer to a display to provide a three dimensional perspective of the virtual object from the videogame system to a user.

8. The method according to claim 7, further comprising increasing the first and second buffer memory size prior to generating the first eye view image and second eye view image in the videogame.

9. The method according to claim 7, wherein calculating the second spatial coordinates comprises calculating the x and z coordinates only so that there is no deviation in the height of the second eye view of the virtual object with respect to the first eye view of the virtual object.

10. The method according to claim 7, wherein calculating the second spatial coordinates of the second view image of the virtual object comprises calculating the spatial coordinates of a right eye camera view position.

11. The method according to claim 7, wherein the first and second buffers are located in the memory of a video graphics card.

12. The method according to claim 7, wherein storing the first eye view image to the first buffer and storing the second eye view image to the second buffer reduces flicker of the images on the display.

13. The method according to claim 7, further comprising:
cleaning the first and second buffers;
closing the first and second buffers;
redrawing a scene comprising the virtual object;
getting coordinates of a new perspective of the virtual object; and
redisplaying the virtual object at the new perspective.

14. The method of claim 7, wherein the calculation of the second spatial coordinates of the second eye view comprises placing the second eye view at a virtual position that is 6.5 to 7.0 cm apart from the calculated position coordinates of the first eye view.

15. The method of claim 7, wherein calculating the second spatial coordinates of the second eye view comprises calculating the slope of a line from a virtual camera positioned at the second spatial coordinates of the second eye view to the virtual object.

16. A videogame system for displaying three-dimensional images, comprising:

first and second buffers;

means for calculating first position coordinates of a first eye view of a virtual object in the videogame system;

means for storing a first eye view image captured virtually from the calculated first position of the first eye view of the virtual object in the videogame into the first buffer;

means for calculating second spatial coordinates of a second eye view of the virtual object in the videogame in three dimensional space by coordinate transformation equations using the calculated first position coordinates of the first eye view and the position of the virtual object in the videogame;

means for determining a second eye view image of the virtual object captured virtually from the calculated second spatial coordinates of the second eye view;

means for storing the second eye view image in the second buffer; and means for outputting the first eye view image from the first buffer and the second eye view image from the second buffer to a display to provide a three dimensional perspective of the virtual object from the videogame system to a user.

17. The videogame system of claim 16, wherein the first and second buffers are part of a memory of a video graphics card.

18. The videogame system of claim 16, wherein the means for calculating second spatial coordinates comprises a programmable processor.

19. The videogame system of claim 16, wherein the display is a stereoscopic visor.

\* \* \* \* \*